Jan. 9, 1951

R. W. MESSENGER

2,537,540

MEANS AND METHOD FOR CUTTING BLANKS FROM THIN SHEETS OR STRIPS OF METAL

Filed Nov. 7, 1945

INVENTOR.
Robert W. Messenger
BY Lancaster, Allwin and Rommel
ATTORNEYS.

Jan. 9, 1951            R. W. MESSENGER            2,537,540
MEANS AND METHOD FOR CUTTING BLANKS FROM
THIN SHEETS OR STRIPS OF METAL Filed Nov. 7, 1945            7 Sheets-Sheet 6

INVENTOR.
Robert W. Messenger
BY
ATTORNEYS.

Patented Jan. 9, 1951

2,537,540

UNITED STATES PATENT OFFICE 2,537,540

MEANS AND METHOD FOR CUTTING BLANKS FROM THIN SHEETS OR STRIPS OF METAL

Robert W. Messenger, Salisbury, Md., assignor of one-fourth to William A. Messenger, one-fourth to Anna Z. Messenger, and one-fourth to Zilda M. Messenger, all of Salisbury, Md.; Zilda Minerva Messenger and William Ashley Messenger executors of said Robert W. Messenger, deceased Application November 7, 1945, Serial No. 627,142

14 Claims. (Cl. 164—17)

This invention relates to means and methods for cutting blanks from thin sheets or strips of metal, and is particularly well adapted to the manufacture of can end blanks. Throughout this specification reference is made generally to such blanks, but it is to be understood that the invention is susceptible of application to means and methods of cutting or stamping various circular, oval or elongated blanks from comparatively thin metal sheets or strips, such as tin plate.

In this specification the term die is used in its broader sense, that is, to denote a pair of companion tools, one of which is generally termed a "punch," and the other a "matrix" or "die proper," used in cutting, or cutting and shaping blanks from stock.

One of the principal objects of the invention is to provide means and a method using double dies for cutting a plurality of blanks from the stock at each stroke of the punch head, to speed up production, in a manner that there are very few non-productive die movements; a minimum wastage in sheets or strips; no likelihood of uneven wearing of the dies (as frequently happens when the die occasionally cuts a partial blank or segment from the sheet), and with a comparatively even load on the prime mover of the stamping or cutting mechanism during operation.

The means and methods here disclosed are particularly well adapted, altho not necessarily limited to use with sheets of the character disclosed in my United States Patent 2,335,292, granted November 30, 1943, having opposite ends cut along zigzag or serpentine lines, sometimes called "scroll ended sheets" and which may be produced with a greater degree of accuracy as to over-all length and with comparatively true gaging edges, in contradistinction to commercial rectangular sheets of tin which generally require trimming of at least two of the edges, in right angular relation, preliminary to the cutting of blanks therefrom. Also, the means and method herein disclosed may be used to produce blanks from much longer sheets or strips than is shown by way of example in my said patent, with many advantages. Among these advantages may be mentioned the ability of canmakers to purchase the stock in very large coils, and cut it into relatively longer sheets than commercial tin plate sheets produced at the tin plate factory, the longer sheets presenting some packaging and transportation problems; the higher economy in metal conservation; and the balance obtained when longer sheets are used which facilitates guiding of the sheets from gage to gage.

The invention aims to avoid cutting partial blanks, segments or slivers of metal from the stock even tho it may be slightly greater in length than specified for the particular size of blanks to be cut therefrom. The invention is susceptible of use in cutting blanks from continuous strip material, sheets and from the so called scroll strips cut from sheets.

Another object of the invention is to provide a means and method whereby extreme accuracy may be obtained in the rapid production of blanks by cutting or punching holes in waste portions of the sheets or strips into which enter gages to hold the stock in proper relation to the dies for cutting blanks from the stock with minimum threads of the stock between the apertures formed by the removal of the blanks.

A further object of the invention is to provide means for cutting the waste portions of the stock from the sheet or strip as the blanks are cut and removed therefrom in a manner to permit the waste to be more readily handled, bundled, etc., and to provide new gaging edges for use as row after row of blanks are cut from the stock.

Other objects and advantages of the invention will appear in the following detailed description, taken in connection with the accompanying drawings, forming a part of this specification, and in which drawings—

Figure 1:
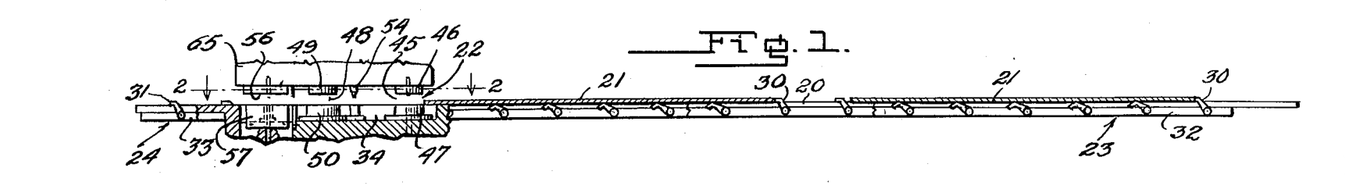
Fig. 1 is a view of a punch press or can end blanking machine constructed according to my invention, partly in elevation and partly in vertical section, showing more or less diagrammatically a series of dies, knives, feeding mechanism, gaging devices and sheets in operative relation to the feeding mechanism, with one of the sheets in readiness to be fed into operative relation to some of the dies.
Figure 2:
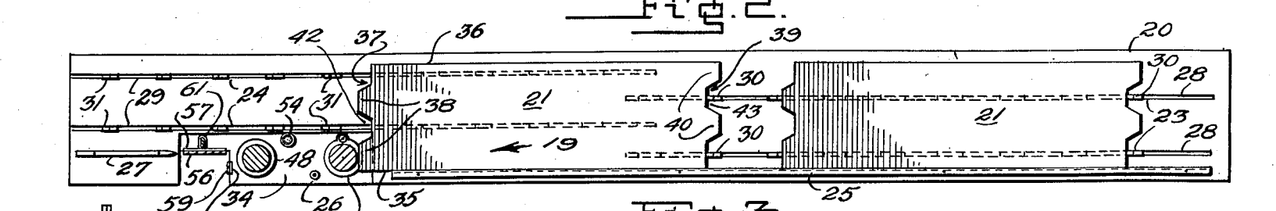
Fig. 2 is a view of the same partly in plan and partly in horizontal section, on substantially the line 2—2 of Fig. 1.

Referring first to the can end blanking machine shown in Figs. 1-17, which may be used in carrying out the improved method of producing can end blanks, such comprises an elongated feed table 20 for supporting sheet or strip metal stock 21; a fabricating mechanism 22 preferably adjacent one end of the table; a primary feed mechanism 23, a secondary feed mechanism 24, each adapted to advance the stock 21 in the direction of the arrow 19 shown in Fig. 2; and guide means 25, 26 and 27 for the stock while on the table.

The table 20, in the example shown, is provided with slots 28 and 29 extending longitudinally of the table for accommodation of feed dogs 30 and 31 carried by reciprocating bars 32 and 33 of the primary and secondary feed mechanisms 23 and 24, since I have elected to illustrate the main elements of a type of feed mechanism common in the art of can making machines, well known to those skilled in the art. The table is also preferably provided with a recess 34 to accommodate parts of the fabricating mechanism 22.

The stock 21, in the example shown is similar to the sheets shown in my aforesaid Patent 2,335,292 in that each sheet has substantially parallel side margins 35 and 36, its leading end 37 provided with spaced tabs 38 each of a size to provide substantially one-half of the area of one of the potential can end blanks, and the trailing end 39 provided with tabs 40 in spaced apart relation, each of a size to also provide substantially one-half of the area of one of the potential can end blanks. It is understood that this example of stock sheet is dimensioned to provide a great number of parallel rows of potential can end blank producing spaces, with a like number of spaces in each of the rows, and with the spaces of any given row in staggered relation to an adjacent row with sufficient material to provide threads of material between the blanks when cut from the sheet. This type of sheet is made for economical production of can end blanks, for the skeleton of metal containing the intervening spaces, generally termed "waste," is a very small proportion of the entire material of the sheet before fabrication into blanks and avoids the waste occurring in fabrication of ordinary rectangular sheets. This type of stock sheet 21 provides notches 42 and 43 between the tabs 38 and 40, respectively.

According to the present invention it is preferred to act upon sheets, each having an even number of potential can end blank producing spaces in each row. While in Figs. 2-8 I have shown the sheet as having four of such rows it is to be understood that this is merely by way of example and that the machine and method may be used in connection with sheets having many more or less than such number of rows. With perhaps some sacrifice in that more waste will occur, or more labor will be necessary, the machine and method may also be used in connection with ordinary rectangular sheets or strips and scroll strips. To some extent such may also be used in fabricating long coil stock into can end blanks.

The fabricating mechanism, in the example shown, comprises a first can end blanking die 45 comprising a punch 46 and a matrix 47; a second can end blanking die 48 comprising a punch 49 and a matrix 50; a gage hole perforating die 51 comprising a punch 52 and a matrix 53; a gaging pin 54 preferably of a split type cooperating with an expanding means 55 as hereinafter described; a pair of cooperating major shearing knives 56 and 57; a pair of cooperating minor shearing knives 59 and 60; and a waste shearing die 61 comprising a punch 62 and a matrix 63. The punches 46, 49, 52 and 62, the gaging pin 54 and the knives 56 and 59 are preferably carried by a reciprocable head 65 of any ordinary or approved type, and the matrices 47, 50, 53 and 63, the means 55 and the knives 57 and 60 are preferably accommodated in the recess 34 of the table 20. The gaging pin 54 extends a considerable distance below the plane of the leading edge of punches 46 and 49 so that it enters, and in the example shown is expanded into intimate contact with the wall of perforation made in the stock by punch 52 as hereinafter described, so as to accurately locate and hold the stock in proper relation to the dies 45 and 48 as they descend to punch can end blanks from the stock.

The dies 45 and 48 are spaced apart a distance equal to the diameter of two can end blanks, plus the necessary threads of metal to avoid defects. This is perhaps best shown in Fig. 6. In other words the dies 45 and 48 are spaced apart longitudinally of the path of travel of the stock on table 20, a distance equal to the distance between the center lines of four consecutive potential can end blank spaces. This is important and a radical departure from the spacings used in the past and has numerous advantages as hereinafter noted.

The gage hole perforating die 51 may be located in any appropriate position, where it will produce a perforation in the waste, as remote as possible from any thread of the waste. In Figs. 1–15 is shown located adjacent the first can end blanking die 45 with its axis in a vertical plane at right angles to the vertical plane common to the axes of dies 45 and 48 so as to produce a perforation in a substantially triangular area of the skeleton waste commonly produced in cutting can end blanks in rows and in staggered relation, common in fabricating from ordinary sheets of tin plate. The location of the perforation produced by die 51 determines the location of the gaging pin 54, in the same relationship to said plane of the dies 45 and 48, but adjacent the die 48.

Figures 6, 7:
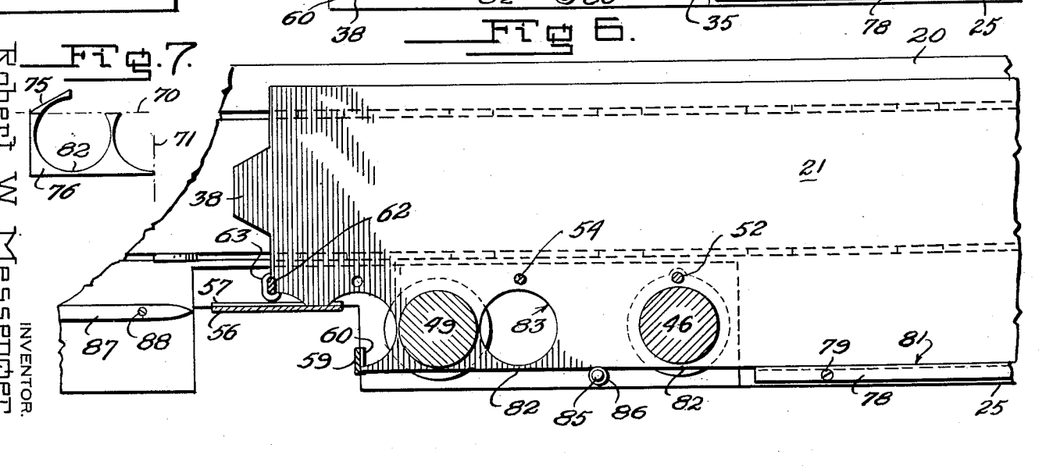
Fig. 6 is a fragmentary view similar to Fig. 5, but showing the relative position of parts after the second stroke of the secondary feeding mechanism.
Fig. 7 is a view in plan of scrap cut from the stock when the sheet is in the position shown in Fig. 5 and the dies have been operated to cut two blanks from the stock and knives have operated to sever such scrap from the stock.

The shearing knives 56 and 57 constructed and arranged so as to cut waste left by the dies, along a line parallel to the direction of feed (arrow 19, Fig. 2), the line passing thru the apertures formed by the removal of blanks from the sheet as is shown in Figs. 6 and 7. The shearing knives 59 and 60 are in right angular relation to knives 56 and 57 and function to sever the thread of material at the margin of the stock adjacent the row of blanks fabricated. For instance the waste shown in Fig. 7, has been cut from the stock along the line 70 by the knives 56 and 57 and along the line 71 by the knives 59 and 60. These knives, and particularly knives 56 and 57 may be of any desired length and positioned for cutting the waste at any zone along the path of travel of the stock. In the example shown they are arranged to cut the waste in each step by step movement of the secondary feed mechanism 24 as the second can end blanking die 48 is producing its second can end blank in the row, as shown in Fig. 6.

Figure 8:
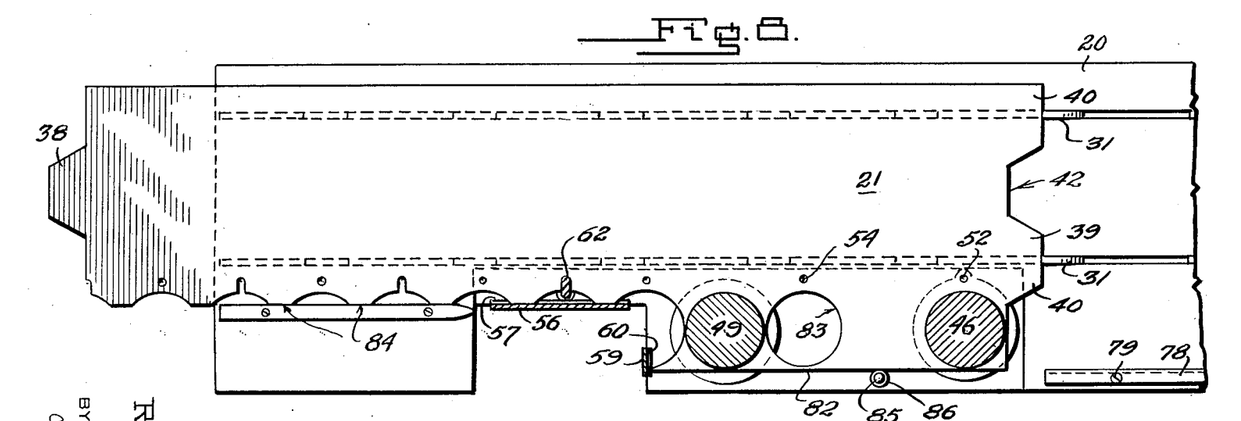
Fig. 8 is a view similar to Fig. 6, but showing the sheet as having been advanced by successive strokes of the secondary feeding mechanism and dies until nearly all of the blanks in a row have been cut from the sheet and the next stroke will position the sheet for cutting of the final blank in that row.
Figure 10:
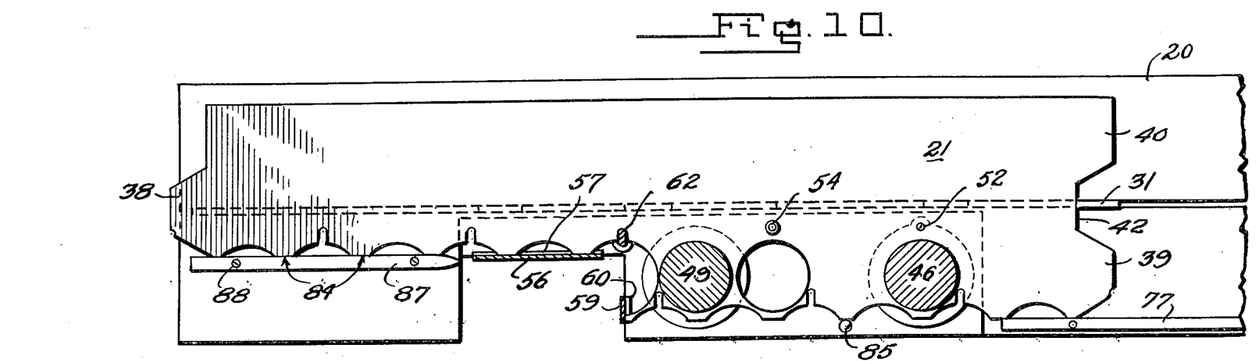
Fig. 10 is a view similar to Fig. 9, but illustrating the sheet shown therein as having been advanced by secondary feed mechanism to a position where several blanks in the second row of the sheet have been cut from the stock.
Figure 11:
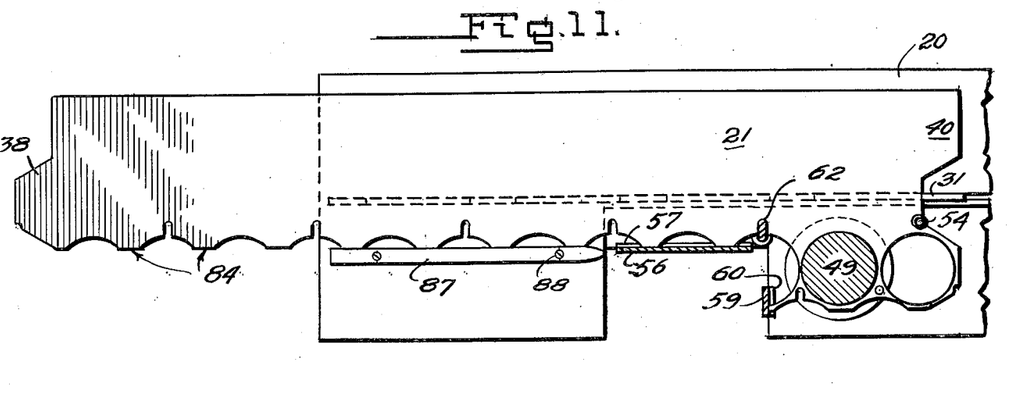
Fig. 11 is a view similar to Fig. 10, but showing the relative position of the sheet to the dies for cutting the last blank from the row.
Figure 14:
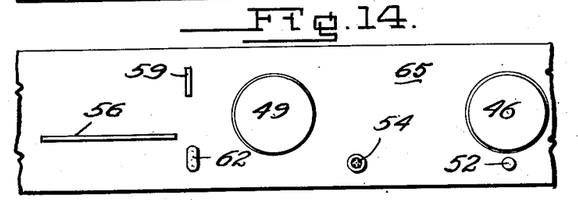
Fig. 14 is a similar view of the head carrying the dies and knives used in connection with the even numbered rows of the stock.
Figures 15, 16, 17:
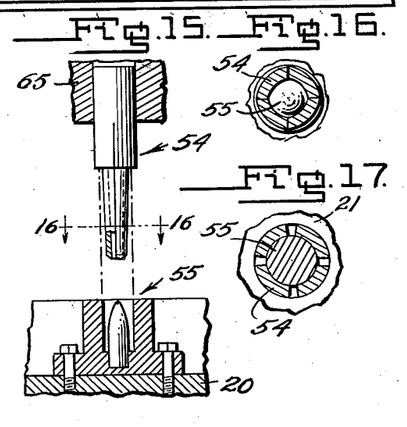
Fig. 15 is a detail view, partly in elevation and partly in vertical section of gaging mechanism operable simultaneously with the dies, and including a split spreadable pin.
Fig. 16 is a sectional view on the line 16—16 of Fig. 15.
Fig. 17 is a view similar to Fig. 16 but showing the split pin spread in a gaging aperture in the stock.

The waste shearing die 61 is desirable when the machine is to operate with sheets of the character disclosed in my aforesaid Patent 2,335,292 and is differently located, as shown in Figs. 8 and 10 according to whether the fabricating mechanism 22 is to act on a sheet having a tab 38 foremost in the path of travel, or a tab 39 rearmost in such path. In Figs. 1–8, inclusive, and Fig. 13, the waste shearing die 61 is shown in proper position for severing a segment 75 shown in Fig. 7 from tab 38 of the stock, simultaneously with action of the knives 56—57 and 59—60 in severing the main portion 76 of the skeleton of metal from the stock. While the segment 75 might be allowed to remain attached to the stock, it is likely to interfere with subsequent operation on the remainder of the stock being rather slender and fragile. In Figs. 10, 11 and 14, the waste shearing die 61 is shown in proper position for shearing a similar segment from the trailing tab 39, for a like purpose.

Figure 9:
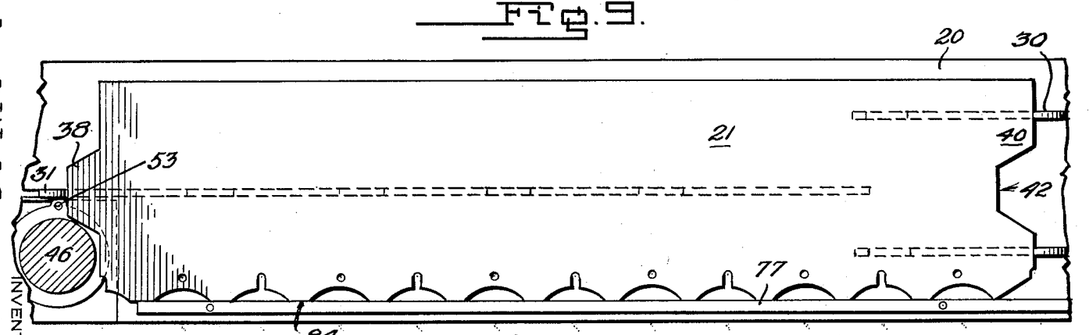
Fig. 9 is a view similar to the upper portion of Fig. 3, but showing the gage edge on the sheet, resulting from the cutting of scrap from the stock during cutting of the first row of blanks, and a primary feed mechanism positioning the thus fabricated sheet in close proximity to but not beneath the dies.
Figure 12:
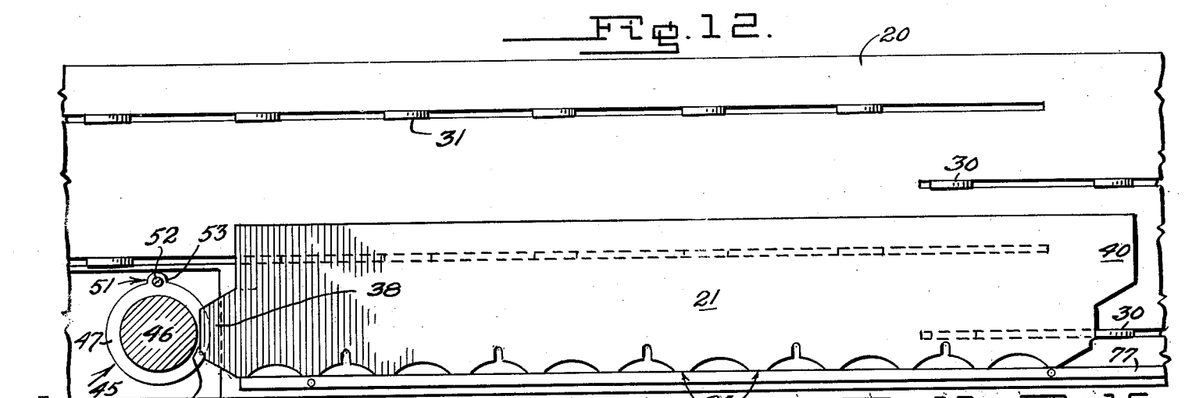
Fig. 12 is a view similar to Fig. 9 but showing the gage edge on the sheet, resulting from the cutting of scrap from the stock during cutting of the second row of blanks.
Figure 13:
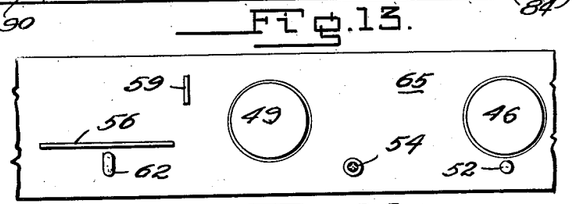
Fig. 13 is a plan view of the lower face of the head carrying the dies and knives for cutting the blanks and severing the waste from the first and uneven numbered rows of the stock.

The guide means 25 has for its purpose to guide the stock 21 in a straight path toward, and while being acted upon by the fabricating mechanism 22. It is old in the art to provide such guide means. In the example shown it comprises a base guide bar 77 which may be adjustably secured to the table 20 in any suitable manner, and a supplemental guide bar 78 detachably carried thereby as by screws 79, these bars extending longitudinally of the table for engagement with a margin of the stock which parallels the path of movement thereof over the table. The bars 77 and 78 are both used, as shown in Figs. 1–7, when the first row of blanks are being cut from the stock, the bar 78 having its guiding face 81 located so as to engage the continuous margin 35 of the stock in a manner to provide only a small thread 82 of material between the apertures 83 formed by the removal of the blanks, and the margin 35. However, when the machine is used for acting upon stock of which the first row of blanks have been cut and most of the skeleton of metal trimmed therefrom to provide a new but interrupted guiding edge 84 the supplemental guide bar 78 is removed, as shown in Figs. 9, 10 and 12.

The guide means 26 may be provided in the zone of the dies 45 and 48 to assist in guiding the stock in a proper path after it leaves guide means 25, and is aligned therewith. It may comprise a pin 85, and a roller or sleeve 86 detachably carried thereby, the latter being used only when supplemental guide bar 78 is also used.

The guide means 27 is preferably in the form of a bar 87 adjustably carried by and extending longitudinally of the table, as by screws 88. Its function is to engage the guiding edge 84 of the stock after the skeleton of metal has been partially cut from the stock, as shown in Figs. 8, 10 and 11.

Figure 3:
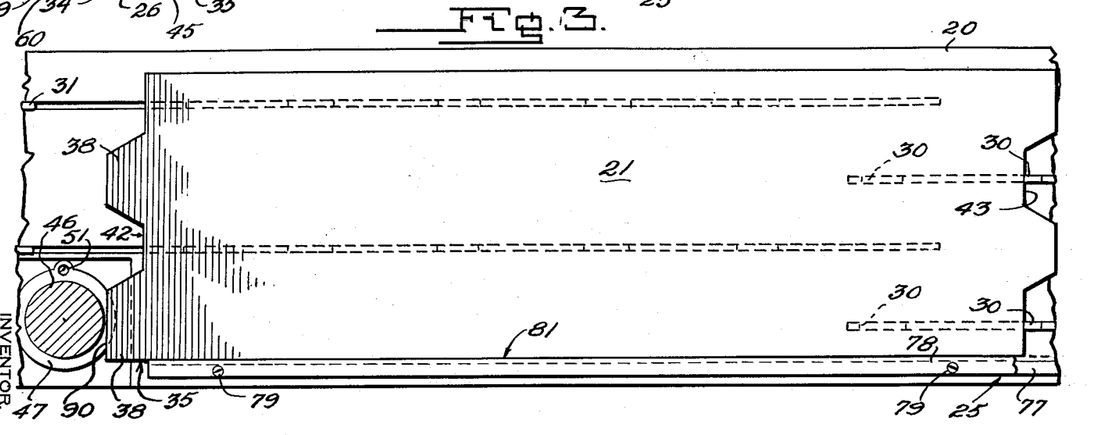
Fig. 3 is a view similar to Fig. 2, but on an enlarged scale, to disclose preferred details and of only that portion of Fig. 2, that generally includes one of the stock sheets and the initially operating dies.
Figure 4:
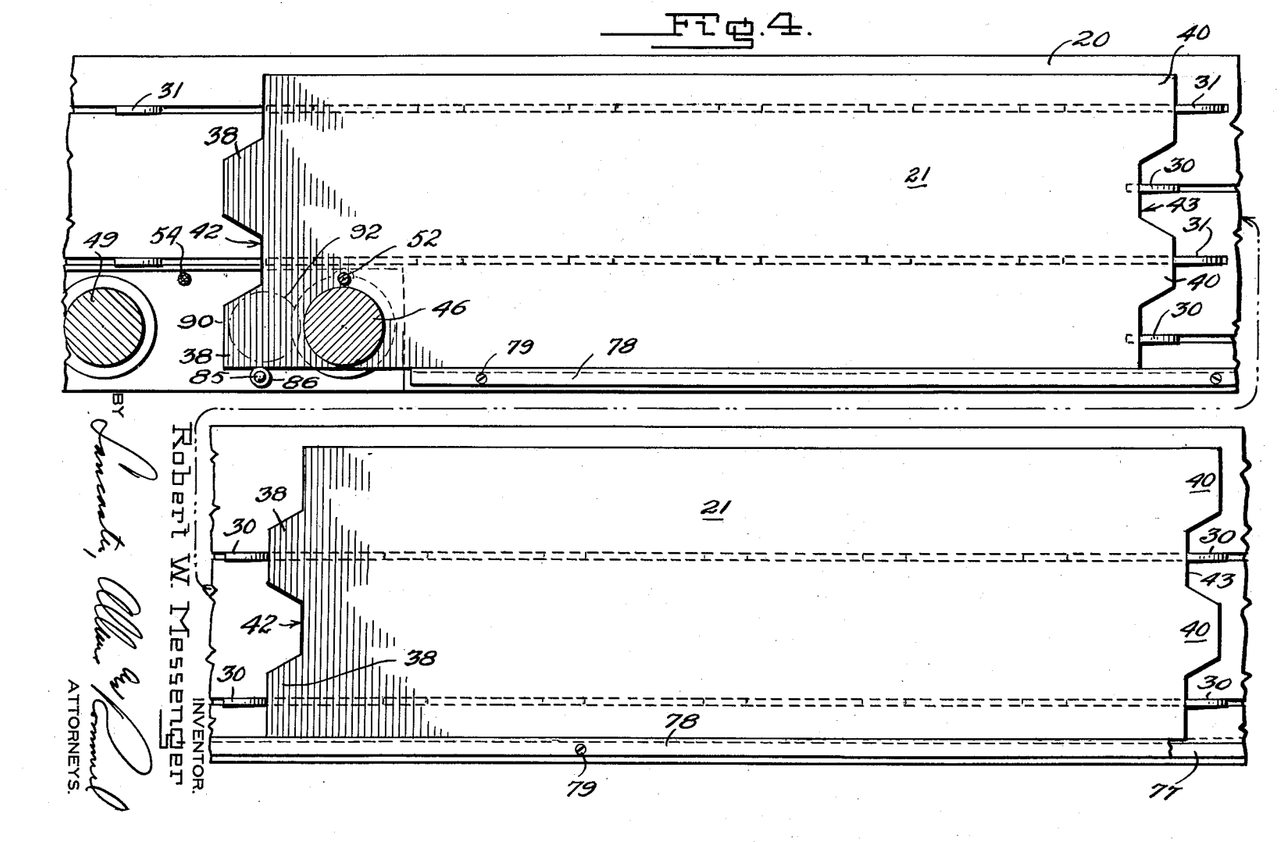
Fig. 4 is a view similar to Fig. 2, but broken, because of its length, and showing the relative position of the leading sheet to the dies after the final feeding stroke of the primary feeding mechanism, a trailing sheet being shown in the continuing lower portion of the view, also in relation to said primary feeding mechanism.

Referring now to the primary feed mechanism 23, including the feed dogs 30 and reciprocating bars 32, generally common in the art, as shown in Fig. 2 the dogs thereof are spaced apart a distance greater than the dogs 31 of secondary feed mechanism 24 so that the mechanism 23 has a greater stroke than the latter and hence produces greater step by step movement of the stock when the machine is in operation. This is common practice, but in the present instance the primary feed mechanism is made and adjusted so that when the dogs 30 shown in full lines in Fig. 3, have reached the limit of their forward travel, the forward edge 90 of tab 38 is sufficiently spaced from the punch 46 that when such descends it will not cut a sliver of metal therefrom. This will be true even tho the stock may be a little longer than required for the number of potential can end blank spaces, plus the minimum width of threads of material between such spaces and the ends of the sheet in the row. Also the dogs 30 shown in dotted lines in Fig. 3 are located with respect to the other dogs of the primary feed mechanism 23 that when they have reached the limit of their forward travel, as shown in Fig. 4, the stock will have been advanced to locate the tab 38 so that its margin 90 is midway between the punches 46 and 49 if the stock is of accurate length, or slightly toward the die 49 if of overlength. The important feature of this is that the last dog of primary feed mechanism 23 moves the stock for the first fabricating action of mechanism 22 to a position that there remains to the rear of punch 46, a sufficient area for the exact number of potential can top producing areas with intervening threads that there will be no defective can end blank produced at the end of the row (see Fig. 8).

Figure 5:
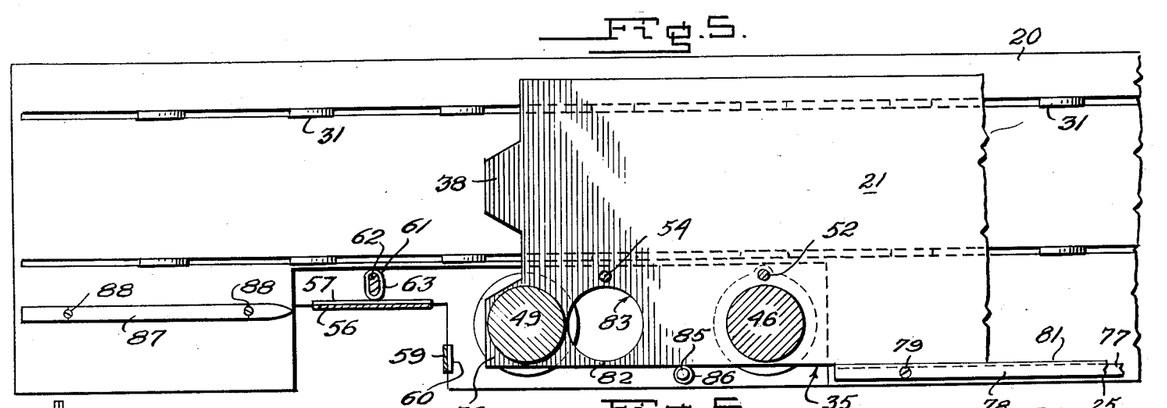
Fig. 5 is a fragmentary view similar to Fig. 4, but showing the position of the leading sheet after one blank has been cut therefrom and the sheet is in another position with respect to the dies, due to the first stroke of secondary feeding mechanism.

It will be noted from Fig. 4 that the final action of the primary feed mechanism 23 positions the stock for cutting only one can end blank, inwardly from its forward margin, a distance such as to leave a reserve potetial can end blank producing space 92 indicated by dot and dash lines in Fig. 4, plus the necessary thread areas between such space and the forward end of the stock and between such space and the forward edge of die 46. This reserve space 92 is used by punch 49 after the secondary feed mechanism 24 has advanced the stock one stroke, as shown in Fig. 5.

The secondary feed mechanism 24 takes up the step by step movement of the stock after this final feed of the primary feed mechanism 23, and its dogs 31 are spaced apart and the throw of the feed bars 33 are such as to move the stock a distance equal to the distance between the center lines of three potential can end producing spaces at each stroke. Thus after die 45 has produced the first can end blank adjacent the leading edge of the stock, but to the rear of the reserve space 92, both dies 45 and 48 operate on the stock producing two can end blanks at each stroke and leaving a reserve space between the apertures in the stock at each stroke, until the rear end of the stock is reached, whereupon the die 48 cuts the last can end blank from the row at the last reserve space.

In feeding or placing the stock in operative relation to the primary feed mechanism 23, there is left a gap between the leading sheet or strip and the trailing sheet or strip, as shown in Fig. 2, so that the die 45 will be non producing and will not injure the trailing sheet when the last can end blank is being cut from the row by die 48.

After the initial row of can end blanks have been cut from the stock and the major portion of the resulting waste skeleton has been trimmed therefrom, the stock may be fed to another blanking machine of the character shown in Figs. 9, 10 and 11, particularly well adapted, in the example shown to act upon the stock which has a tab 39 at the trailing row of potential can end blank producing spaces. When that is finished the stock may again be fed to the first machine described in detail, the supplemental guide bar 79 being first removed, as shown in Fig. 12.

By cutting the waste skeleton from the stock, in sections, it may be more readily carried away from the machine and boxed or baled for storage, shipment, etc., and the guide means 27 may be brought into use shortly after the first few blanks have been cut from the row.

Figure 18:
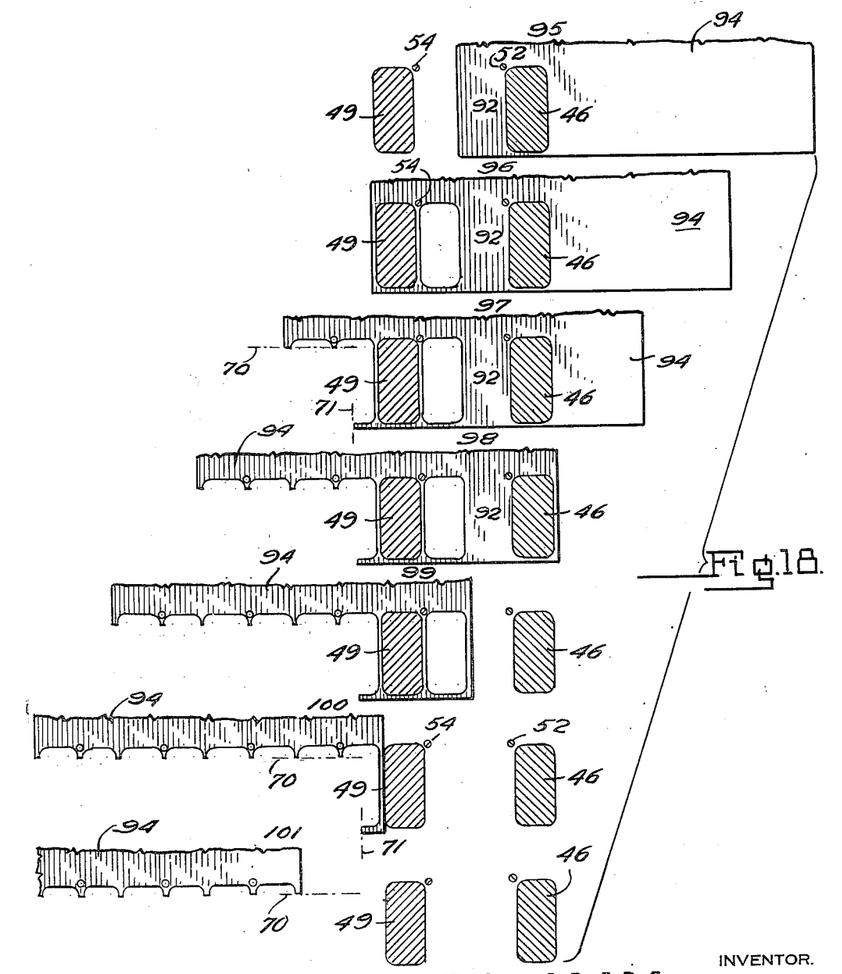
Fig. 18 is a diagrammatic view showing the manner in which the stock such as tin plate, is fed to the dies and knives during the steps taken to cut a row of blanks and trim the scrap therefrom.

In Fig. 18 is diagrammatically represented the sequence of steps taken in blanking elongate can ends or the like from ordinary rectangular sheet stock 94, only a fragment of the stock being illustrated. While the stock is there shown as having eight potential blank producing spaces with necessary thread areas it is contemplated that the stock may be of such length as to permit cutting a much greater number of blanks from each row. By the machine and method of the present invention, the same precision, and economy may be obtained by the spacing of the blanking dies of the character previously described and by providing the reserve blank area in advance of each punch 46, to be subsequently utilized by action of punch 49. Since the blanks of the rows need not be in staggered relation the machine may be simplified to quite some extent, such as by the omission of the waste shearing die 61, and the same machine may be used for cutting blanks from each row by the removal of the supplemental guide bar 78, after the initial row has been cut from the stock. The various steps from that of cutting the first blank from the stock as well as trimming the waste skeleton from the stock are indicated at 95 to 101. At step 100 it is of course understood that another sheet, not shown in the drawing, may follow the sheet of which the row is completely blanked, and can be in the process of having the first blank cut therefrom.

While I have herein described the punch presses for producing the can end blanks as each adapted to operate with respect to one row of potential can end blank spaces, it is to be understood that these presses may be arranged in line with suitable feed mechanism to carry the stock along from one press to another until the stock has been entirely fabricated into blanks, without the necessity of manually placing the stock on each feed table of each press.

It is of course understood that any suitable hold-down strips or devices may be used with the presses. These are accessories which those skilled in the art will use wherever deemed necessary or desirable, and hence have not been shown in the drawings. Also, while various views of the drawings have been described as "plan views" and "elevations" it is to be understood that the tables, etc., may be tilted as is common practice to an angle of approximately 50°, by way of example, with the guides lowermost, without departing from the spirit of this invention.

I claim:

1. The method of cutting a row of like can end blanks from sheet or strip metal stock, leaving waste thread areas between the ends of the stock and the blanks, which comprise, first, cutting a first can end blank from an area of the stock spaced from an end of the stock equal to the area of the blank plus the waste threads, leaving a reserve potential can end producing space between said end of the stock and the aperture formed by the removal of said first blank; second, simultaneously cutting two can end blanks, one of which is from said reserve area and the other from an area spaced from the aperture formed by said first step a distance equal to the area of the can end blank plus the waste threads, leaving a reserve potential can end producing space between the apertures formed by the removal of can end blanks of the second step; repeating the second step a number of times, each time using the reserve area for production of one of the two can end blanks and leaving a like reserve area, until the other end of the stock is reached; and, finally cutting a blank from the last reserve area.

2. The method of cutting a row of like can end blanks from sheet or strip metal stock leaving waste areas between and around the blanks, which comprises, first, cutting a first can end blank from an area of the stock spaced from an end of the stock equal to the area of the blank plus the waste between the blank and the end of the stock, leaving a reserve potential can end producing space between the said end of the stock and the aperture formed by the removal of said first blank, and also cutting a gage perforation in the waste area; second, inserting a gage in said perforation to hold the stock in a fixed position, simultaneously cutting two can end blanks, one of which is from said reserve area and the other from an area spaced from the aperture formed by said first step a distance equal to the area of the can end blank plus the waste between the blanks, leaving a reserve potential can producing area between the apertures formed by the removal of the can end blanks of the second step and also cutting a gage perforation in the waste area; repeating said second step a number of times, each time using the reserve area for the production of one of the two can end blanks and leaving a like reserve area, until the other end of the stock is reached; and, finally cutting a blank from the last reserve area.

3. Those steps in the method of cutting a row of like can end blanks from sheet or strip metal stock, leaving waste thread areas between the ends of the stock and the blanks, and preparing the residue of the stock for cutting a subsequent row or rows of like blanks therefrom, which comprises first, cutting a first can end blank from an area of the stock spaced from an end of the stock equal to the area of the blank plus the waste threads, leaving a reserve potential can end producing space between said end of the stock and the aperture formed by the removal of said first blank; second, simultaneously cutting two can end blanks, one of which is from said reserve area and the other from an area spaced from the aperture formed by said first step a distance equal to the area of the can end blank plus the waste threads, leaving a reserve potential can end producing space between the apertures formed by the removal of can end blanks of the second step; third, repeating the second step using the reserve area of said second step for the production of one of the two can end blanks and also simultaneously severing the waste threads resulting from said first and second steps from the stock along a line parallel to the row to provide a guide edge for subsequent production of another row of like can end blanks.

4. The method of cutting can end blanks from an elongated sheet or strip of metal of a size to provide a great number of parallel rows of potential can end producing spaces, there being an even number of such spaces to each row, which comprises feeding the sheet or strip longitudinally to a pair of reciprocating dies of a given size to correspond with the size of the sheet or strip worked upon, spaced apart longitudinally of the path of travel of the sheet or strip a distance equal to the distance between the center lines of four potential can end producing spaces, the feeding of the sheet or strip being step by step each time a distance equal to the distance between the center lines of three potential can end producing spaces, and the sheet or strip fed so that the first step locates the sheet beneath one only of the dies of said pair of dies, first in the path of travel of the sheet or strip, with the leading edge of the latter located substantially midway between said dies whereby a single can end is produced by the first cycle of movement of said dies, and thereafter, two can ends are produced by each succeeding step of movement of the sheet or strip and cycle of movement of the dies, until the trailing edge of the sheet or strip is substantially midway between said dies whereby a single can end is produced by the final cycle of movement of said dies operating on said row of the sheet or strip.

5. The method of cutting can end blanks from an elongated strip of metal of a size to provide a great many potential can end producing spaces in side by side relationship longitudinally of the strip, comprising feeding the strip, step by step, a distance at each step equal to the distance between the center lines of three potential can end producing spaces, to a pair of simultaneously operating dies of a given size to correspond with the size of the strip worked upon, and spaced apart longitudinally of the path of travel of the strip, a distance equal to the distance between the center lines of four potential can end producing spaces.

6. The method of cutting can end blanks from an elongated sheet of metal of a size to provide a plurality of parallel rows of potential can end producing spaces, comprising feeding the sheet, step by step a distance, at each step, equal to the distance between the center lines of three potential can end producing spaces, to a pair of simultaneously operating dies of a given size to correspond with the size of the sheet or strip worked upon, and spaced apart longitudinally of the path of travel of the sheet or strip a distance equal to the distance between the center lines of four potential can end producing spaces, and to a knife means operating simultaneously with said pair of dies, for cutting the waste left by said dies upon a line parallel to the direction of feed, to form a new guiding edge, said line passing through the apertures formed by the removal of the blanks from the sheet.

7. The method of cutting can end blanks from an elongated sheet of metal of a size to provide a plurality of parallel rows of potential can end producing spaces, comprising feeding the sheet step by step a distance, at each step, equal to the distance between the center lines of three potential can end producing spaces, to a pair of simultaneously operating dies of a given size, to correspond with the size of the sheet or strip worked upon, and spaced apart longitudinally of the path of travel of the sheet or strip a distance equal to the distance between the center lines of four potential can end producing spaces, and to a plurality of angularly related knives, for cutting the waste left by said dies upon a line parallel to the direction of feed to form a new guiding edge and upon a line in angular relation to the direction of feed, said lines passing through the apertures formed by the removal of the blanks from the sheet.

8. In a machine for blanking can ends from sheet metal, the combination of means for moving the sheet, step by step in a straight path; a pair of like, simultaneously operable can end blanking dies, spaced apart the distance longitudinally of said path equal to the diameter of two can end blanks which may be produced thereby, plus the necessary threads of metal to avoid defects; a gage hole perforating die adjacent to and operable with one of said blanking dies for operation in a waste zone of the sheet; and, a gaging pin adjacent to and operable with the other of said blanking dies, for entry into the perforation made by said gage die, when the sheet has been moved along said path a distance equal to the said spacing of said blanking dies.

9. In a machine for blanking can ends from sheet metal, the combination of means for moving the sheet, step by step in a straight path; a pair of like, simultaneously operable can end blanking dies, spaced apart the distance longitudinally of said path equal to the diameter of two can end blanks which may be produced thereby, plus the necessary threads of metal to avoid defects; a gage hole perforating die adjacent to and operable with one of said blanking dies for operation in a waste zone of the sheet; an expansible gaging pin adjacent to and movable with the other of said blanking dies, for entry into the perforation made by said gage dies, when the sheet has been moved along said path a distance equal to the spacing of said blanking dies; and means for expanding said gaging pin in said perforation, before its companion blanking die cuts a can end blank from the sheet during the power stroke thereof.

10. In a can end blanking machine for use with an elongated sheet or strip of metal, of a size to provide a great many and an even number of potential can end producing spaces with waste thread areas at the ends of the sheet or strip and between the producing spaces in a row, the combination of, a table provided with means for guiding the sheet in a straight path of movement parallel to said row; a first can end blanking die operable across said path; a second can end blanking die operable across said path, said first and second dies spaced apart longitudinally of said path, a distance equal to the distance between the center lines of four next adjacent of said potential can end blank spaces; a first step by step mechanism for moving said sheet or strip in said path with its leading edge adjacent said first die at one stroke and for moving the sheet with its leading edge substantially midway between said dies at its next stroke; and a second step by step feed mechanism for moving said sheet or strip in said path, after said first feed mechanism has moved the sheet to said last mentioned position, a distance at each stroke equal to the distance between the center lines of three potential can end producing spaces of the sheet.

11. In a can end blanking machine for use with an elongated sheet or strip of metal, of a size to provide a great many and an even number of potential can end producing spaces with waste thread areas at the ends of the sheet or strip and between the producing spaces in a row, the combination of, a table provided with means for guiding the sheet in a straight path of movement parallel to said row; a first can end blanking die operable across said path; a second can end blanking die operable across said path, said first and second dies spaced apart longitudinally of said path, a distance equal to the distance between the center lines of four next adjacent of said potential can end blank spaces; a first step by step feed mechanism for moving said sheet or strip in said path with its leading edge adjacent said first die at one stroke and for moving the sheet with its leading edge substantially midway between said dies at its next stroke; and a second step by step feed mechanism for moving said sheet or strip in said path, after said first feed mechanism has moved the sheet to said last mentioned position, a distance at each stroke equal to the distance between the center lines of three potential can end producing spaces of the sheet, said first feed mechanism being constructed and arranged that its stroke is greater than said second feed mechanism.

12. In a can end blanking machine for use with an elongated sheet or strip of metal, of a size to provide a great many and an even number of potential can end producing spaces with waste thread areas at the ends of the sheet or strip and between the producing spaces in a row, the combination of, a table provided with means for guiding the sheet in a straight path of movement parallel to said row; a first can end blanking die operable across said path; a second can end blanking die operable across said path, said first and second dies spaced apart longitudinally of said path a distance equal to the distance between the center lines of four next adjacent of said potential can end blank spaces; a first step by step feed mechanism for moving said sheet or strip in said path with its leading edge adjacent said first die at one stroke and for moving the sheet with its leading edge substantially midway between said dies at its next stroke; and a second, step by step feed mechanism for moving said sheet or strip in said path, after said first feed mechanism has moved the sheet to said last mentioned position, a distance at each stroke equal to the distance between the center lines of three potential can end producing spaces of the sheet, said first feed mechanism being constructed and arranged that its stroke is greater than said second feed mechanism, and said first feed mechanism being constructed and arranged that when it has reached the limit of its second mentioned stroke, there are an even number of potential can end producing spaces with waste thread areas therebetween and between the trailing end of the sheet or strip, and the cutting zone of said first mentioned die and any surplus area in the sheet will be disposed between said blanking dies.

13. In the method of cutting a plurality of blanks, such as for can ends, from an elongated strip of material of a size to provide a great many potential blank producing spaces in side by side relationship longitudinally of the strip, with a plurality of dies in alignment having intervals therebetween equal to the cutting space of the total number of dies plus the space required for threads of the stock strip between the blank spaces and at the ends thereof, which consists in feeding the strip material in the direction of the alignment of the dies for a first cut made by the first die at a space from the end of the strip equal to the space of the number of dies less one together with the corresponding thread spaces for cutting the first blank and thereafter feeding the strip so that the cut made by the first die is a thread distance away from the second die and so that when the strip reaches the last die, the last die will cut the blank in the space forward of any cut by any die in advance thereof.

14. In the method of cutting a plurality of blanks, such as for can ends, from an elongated strip of material of a size to provide a great many potential blank producing spaces in side by side relationship longitudinally of the strip, with a plurality of dies in alignment having intervals therebetween equal to the cutting space of the total number of dies plus the space required for threads of the stock strip between the blank spaces and at the ends thereof, which consists in successively feeding the strip material in the direction of the alignment of the dies for cutting operations made by the dies so that the cuts made by the first die are successively a thread distance away from the second die and so that when the strip reaches the last die, the last die will cut the blank in the space forward of any cut by any die in advance thereof.

ROBERT W. MESSENGER.

REFERENCES CITED

The following references are of record in the file of this patent:

UNITED STATES PATENTS

| Number | Name | Date |
|---|---|---|
| 1,434,192 | Blattner | Oct. 31, 1922 |
| 1,941,117 | Teach | Dec. 26, 1933 |
| 2,268,080 | Novick | Dec. 30, 1941 |